United States Patent Office 3,408,000
Patented Oct. 29, 1968

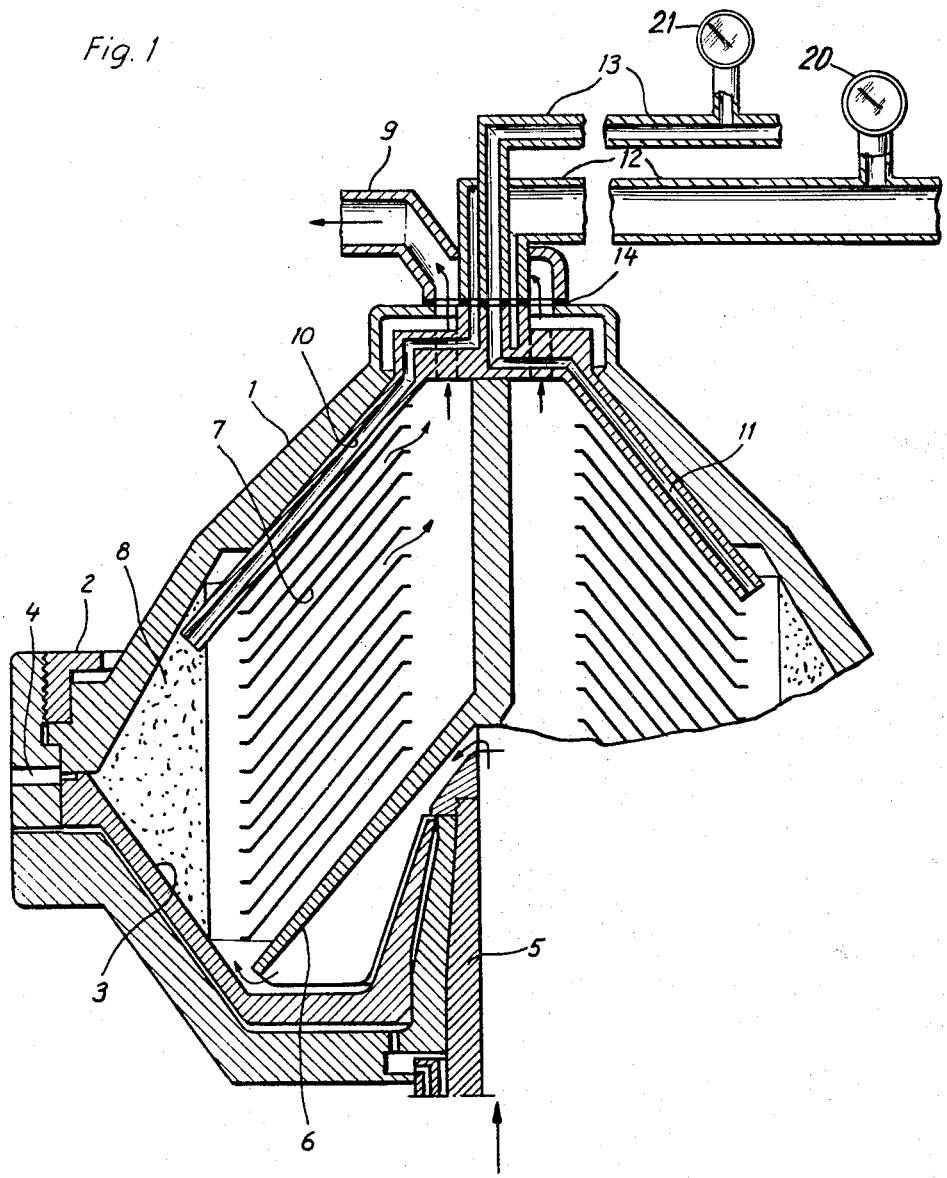

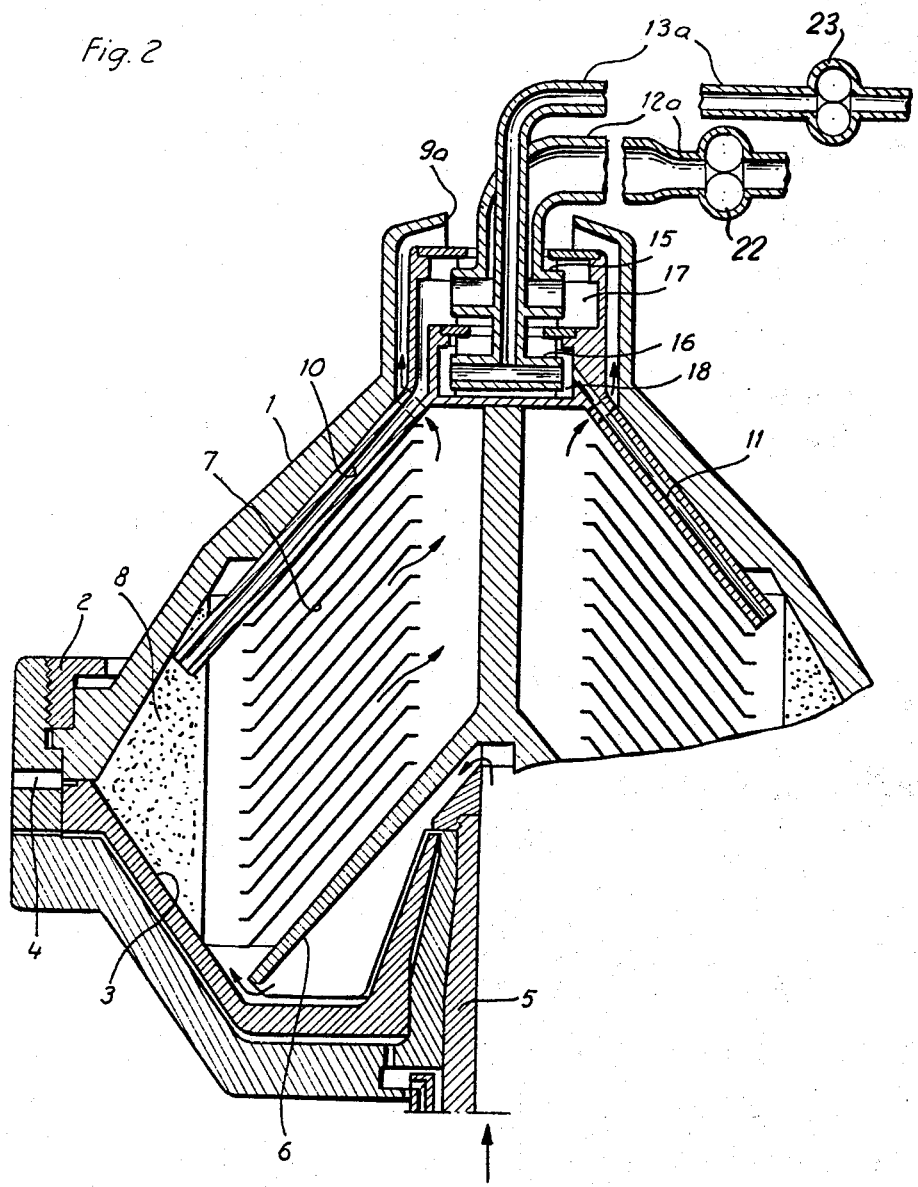

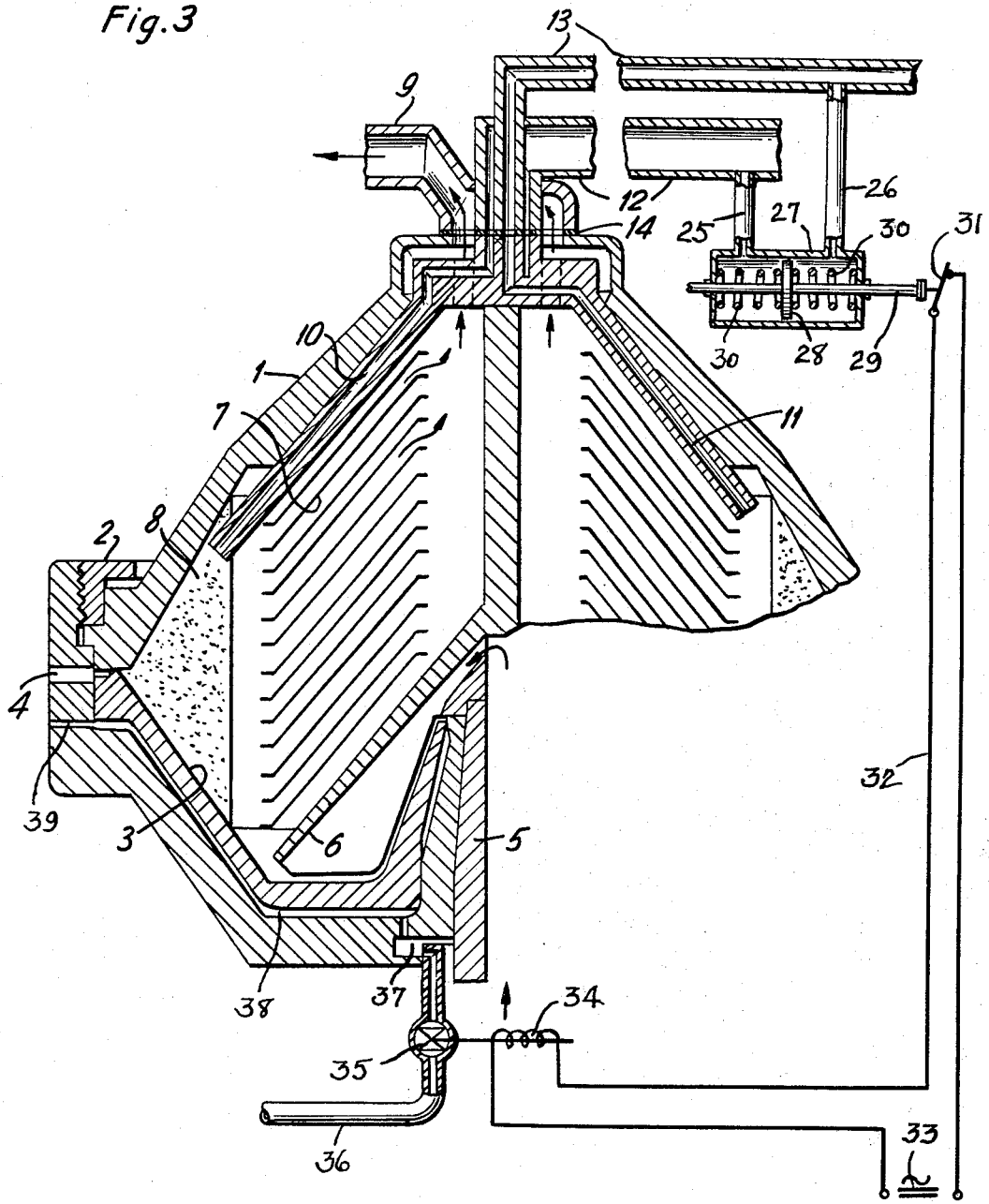

3,408,000
DETERMINATION OF SLUDGE LEVEL IN SLUDGE CENTRIFUGE
Carl-Göran Nilson, Tullinge, Sweden, assignor to Alfa-Laval AB, Tumba, Sweden, a corporation of Sweden
Filed Aug. 16, 1966, Ser. No. 572,763
Claims priority, application Sweden, Aug. 23, 1965, 10,971/65
12 Claims. (Cl. 233—19)

ABSTRACT OF THE DISCLOSURE

Liquid is caused to flow through two separate channels the first of which opens into the sludge space of the centrifugal rotor at a first level, the second channel opening into the separating space of the rotor at a second level which is nearest the rotor axis than is said first level. These two liquid flows remain the same relative to each other until the flow through the first channel becomes clogged by accumulation of sludge to said first level, and such accumulation is detected by comparing the two flows to determine when the flow in the first channel changes relative to that in the second channel.

---

The present invention relates to a method and apparatus for indicating the sludge level in the sludge space of the rotor of sludge centrifuges.

More particularly, the invention relates to the type of sludge centrifuge having an indicating channel leading inwardly from the sludge space towards the center of the rotor and directly or indirectly connected to a duct provided outside the centrifuge, this duct containing a pressure or flow sensing means which indicates clogging of the indicating channel where it opens into the sludge space. German patent specification No. 1,145,100 and U.S. Patent No. 3,167,509, dated Jan. 26, 1965, disclosed such a device, which, however, has certain drawbacks. It requires that there be, inside the rotor, a free liquid surface surrounding a hollow space. Hence, the device cannot function for centrifuges which are filled with liquid to the center of the rotor. Additionally, the device senses the absolute pressure in the sludge space. This means that the sensed pressure change need not be caused by a clogging of the opening of the channel into the sludge space, but may also be caused by other factors which influence the absolute pressure. For example, it may be caused by a level change in the rotor due to an exceptionally large counter-pressure in the paring device forming the liquid outlet, or a similar level change due to an increased rate of liquid supply to the centrifuge.

The present invention makes use of such a flow of liquid through a duct outside the centrifuge, to or from a certain level in the sludge space, as provided heretofore. However, according to the invention, the above-mentioned drawbacks are overcome by providing an additional flow of liquid through another duct outside the centrifuge, and this additional flow is led to or from a level in the separating space which is located closer to the axis of rotation than is the first level. By comparing the magnitude of the additional liquid flow with the magnitude of the first liquid flow, it can be determined when the sludge accumulates to a certain level.

Thus, a centrifuge made according to the invention is similar to that described in the introductory part but has at least one additional indicating channel which also leads from the separating space inwardly towards the center of the rotor and is directly or indirectly connected to a separate duct provided outside the centrifuge, this duct also containing a pressure or flow sensing means; and the opening of the additional indicating channel into the separating space is located at a smaller distance from the axis of rotation than is the opening of said first indicating channel.

The connection of an indicating channel to a duct provided outside the centrifuge can be direct, as for example, through an hermetic seal between a rotating and a stationary sliding surface, or it may be indirect. Indirect connection of an indicating channel to such a duct can be effected by an overflow with a collection chamber, or by a paring device. When hermetic sealing or a paring device is used, the usual stationary duct associated with each seal or paring device may contain a pressure sensing device. If a pressure sensing device is provided in each duct, these devices can be arranged to cooperate with a means which senses the difference between the sensed pressures, such as a diaphragm or a piston, which by its displacement indicates a change of pressure difference. In the case of overflows with collection chambers, a device for sensing changes in the relative flow rates can be used, such as a float. In a self-discharging sludge centrifuge embodying the invention, the previously mentioned pressure-difference sensing means can be arranged to effect the sludge discharges automatically.

With the present invention, the sensing is independent of the absolute pressure prevailing at the opening of the first indicating channel. The absolute pressure at the opening of the other indicating channel is used as a reference level, which in its turn automatically follows a change of absolute pressure in the rotor caused by external conditions, such as a change of liquid level or flow rate. The absolute pressure at the opening of the first indicating channel also follows automatically the absolute pressure in the rotor and consequently also follows changes caused by other circumstances. The difference between the pressures in the two channels will thus be a certain normal value in a sludge-free rotor, and each change of this pressure difference can be caused only by sludge covering the opening of the channel which extends outwardly into the sludge space.

In this way, the sensing of the amount of sludge in the rotor will be independent of the liquid level in the rotor, so that the invention can be used with a rotor filled either partially or completely with liquid. A further advantage is that a more distinct signal is obtained when sludge has begun covering the opening of the indicating channel which extends outwardly into the sludge space. This sludge accumulation can result in only a 10% change of the absolute pressure sensed through the indicating channel, while the same change can amount to several hundred percent of the pressure difference prevailing between the two indicating channels.

Instead of sensing pressure or rate of flow changes, a photocell may be arranged to sense through a sight glass an increasing turbidity in a liquid flow leaving the centrifuge from the indicating channel opening into the sludge space as disclosed, for example, in U.S. Patent No. 2,532,-792 dated Dec. 5, 1950. In order to be able to determine the degree of turbidity which indicates that the sludge in the rotor ought to be discharged, the transparencies of the two liquids leaving the indicating channels are compared as disclosed, for example, in U.S. Patent No. 2,628,-023 dated Feb. 10, 1953. If the difference in transparency is sufficiently large, sludge discharge should be effected.

For a more complete understanding of the invention, reference may be had to the accompanying drawings, in which:

FIG. 1 is a vertical sectional view through a self-discharging sludge centrifuge provided with an embodiment of the present invention;

FIG. 2 is a similar view of another embodiment of the present invention; and

FIG. 3 is a view similar to FIG. 1 showing schematically an arrangement by which the sludge level sensing means automatically effects discharge of the sludge.

In FIG. 1, a rotor body 1 is made in two parts which are kept together by means of a lock ring 2. An axially movable valve piston 3 effects the opening and closing of sludge outlet openings 4 in the rotor wall in a known manner. The rotor is carried and driven by a hollow shaft 5, through the central channel of which liquid to be separated is led into the rotor. This liquid is led by a distributor 6 outwardly to the outer edge of a conical disk set 7. Sludge separated from the liquid forms a layer 8, while liquid purified in the disk set travels radially inwardly and discharges through an outlet duct 9 hermetically connected to the centrifuge top. Furthermore, there are provided in the rotor two indicating channels in the form of pipes 10 and 11. The pipe 10 extends farther from the axis of rotation than does pipe 11. The opening of this longer pipe is shown in the figure as clogged by sludge. The pipes 10 and 11 are hermetically connected to ducts 12 and 13, respectively. The ducts 9, 12 and 13 are stationary and, by means of packing rings 14, are provided with hermetically sealed flow connections through the top of rotor 1.

The device functions in the following way, it being presupposed that the rotor is completely filled with liquid:

Before any significant sludge deposition in the rotor has taken place, liquid flows out through each of the channels 10 and 11 to the appurtenant ducts 12 and 13. Conventional pressure sensing devices 20 and 21 are connected to the ducts 12 and 13, respectively. In the beginning of the separation, these devices show a constant difference in pressure irrespective of total pressure changes occurring in the rotor. However, when the sludge level has grown inwardly to the outer opening of the channel 10, the pressure in this channel as well as the flow rate through the same channel decrease as the opening is progressively clogged, while the conditions in the channel 11 remain unchanged. This change of the difference in pressure can be read off visually from the pressure gauges 20 and 21, the sludge discharge being effected manually when the difference reaches a predetermined value; or the change of difference can be sensed by a conventional means which automatically effects sludge discharge when a predetermined difference is attained, as described more fully hereinafter.

Instead of discharging liquid through the ducts 10 and 11, liquid can be supplied through these ducts. In this case, there may be inserted in each duct 12 and 13 a pump and a pressure or flow rate sensing means. Both pumps can be of the same kind and be driven by the same motor shaft, so that the pressure or flow rate difference is kept constant when the rotor has no accumulation or sludge. As sludge clogs the outer opening of pipe 10, the pressure in the duct 12 increases and the flow rate through it decreases relative to the pressure and flow rate, respectively, in duct 13, thus indicating the need for a sludge discharge.

In FIG. 2, corresponding parts have the same reference numerals as in FIG. 1. The outlets 9, 12 and 13, hermetically sealed according to FIG. 1, are replaced in FIG. 2 by an overflow 9a and the outlets 12a and 13a, respectively. The stationary outlet ducts 12a and 13a are directly connected to paring disks 15 and 16, respectively, which are provided in paring chambers 17 and 18, respectively. Also, the outlet ducts 12a and 13a are provided with conventional flow meters 22 and 23, respectively, for indicating the flow rates through the respective ducts. The pipes 10 and 11 communicate with the paring chambers 17 and 18, respectively. When the sludge clogs the outer opening of the pipe 10, the flow rate through this pipe decreases and the liquid level in the corresponding paring chamber 17 travels outwardly. This means that the pressure in the corresponding duct 12a and the flow rate through it decrease relative to the pressure and flow rate, respectively, in the other duct 13a; and this change in the difference between the two flow rates is shown by the devices 22 and 23, a certain sludge level being indicated when the difference reaches a predetermined value.

It is also possible to operate the FIG. 2 embodiment in the alternative manner described in connection with FIG. 1, by feeding liquid inwardly through the ducts 12a and 13a and the corresponding paring disks and paring chambers. Clogging of the outer opening of the pipe 10 causes an increased resistance to flow through the pipe 10 and an inward travel of the liquid level in the paring chamber 17. This causes the paring disk 15 to operate under an increased head, so that the flow rate in the duct 12a is decreased relative to the flow rate in duct 13a, indicating that the sludge level has reached the pipe 10.

The centrifuge shown in FIG. 3 is similar to that shown in FIG. 1, but the pressure gauges are replaced by a device which senses changes in the pressure difference and which automatically controls the sludge discharge. As shown in FIG. 3, the discharge pipes 12 and 13 communicate through tubes 25 and 26 with opposite end portions, respectively, of a cylinder 27. The latter contains a piston 28 secured to a rod 29 and balanced by opposing springs 30 in the cylinder. When the opening at the outer end of duct 10 is unclogged, the piston rod 29 holds an electric switch 31 closed, as illustrated; but when this duct opening becomes clogged with sludge, the pressure in duct 12 decreases relative to the pressure in duct 13, causing piston 28 to move to the left so as to open switch 31.

Switch 31 is part of an electric circuit 32 comprising a direct current source 33 and a solenoid 34 connected in series with the switch. The solenoid 34 controls a valve 35 in a stationary pipe 36 for supplying an operating liquid to a recess 37 in the lower portion of rotor 1. This recess communicates with the radially inner portion of a chamber 38 between the piston valve 3 and the bottom of the rotor, the radially outer portion of chamber 38 having a restricted outlet 39.

When switch 31 is closed as shown, the solenoid valve 35 is open to supply operating liquid at a rate greater than its discharge through outlet 39, whereby chamber 38 is filled with liquid which forces the piston valve 3 upwardly to close sludge outlet 4. However, when switch 31 opens in response to clogging of duct 10 by sludge, the solenoid 34 is deenergized so that valve 35 closes, resulting in the emptying of chamber 38 by continued discharge of operating liquid through outlet 39. This allows piston valve 3 to move downward, causing sludge to discharge through outlet 4. The resulting unclogging of duct 10 causes piston 28 to reclose the switch 31, thereby opening valve 35 to resume the supply of operating liquid. When this liquid acquires a sufficient level in chamber 38, the piston valve 3 is again raised to close sludge outlet 4.

It will be apparent that the parts 20 through 23 constitute means associated with respective ducts for indicating a change in the flow through a first duct relative to the flow through a second duct and thus indicating clogging of the first duct by sludge accumulation; and the parts 25 through 30 constitute a means for both sensing and indicating changes in the difference between the pressures as well as the flow rates in ducts 12 and 13. Also, the parts 31 through 39 constitute in effect an operative connection between such sensing means and the sludge outlet valve 3 for actuating that valve to discharge sludge when the aforesaid difference becomes a predetermined value.

I claim:

1. In the operation of a sludge centrifuge of the type including a rotor having a central axis and adapted to discharge separated sludge accumulated in an outer annular space of the rotor, the rotor also having a separating space leading inwardly from said sludge space toward the rotor axis and communicating with a separated liquid outlet, the method comprising the steps of inducing the flow of liquid through two separate channels, the first of said channels opening into the sludge space at a first level, the second channel opening into said separating space at a second level which is nearer the rotor axis than is said first level, whereby the two liquid flows remain the same relative to each other until the flow through said first channel becomes clogged by accumulation of sludge to said first level, and comparing said two flows to detect a change in the flow through said first channel relative to the flow through said second channel.

2. The method of claim 1, wherein the pressures of said two flows are compared to detect said change.

3. The method of claim 1, wherein the flow rates of said two flows are compared to detect said change.

4. The method of claim 1, wherein the turbidities of said two flows are compared to detect said change.

5. The method of claim 1, wherein said two liquid flows are induced into the rotor from the respective channels.

6. The method of claim 1, wherein said two liquid flows are induced from the rotor into the respective channels.

7. In a sludge centrifuge comprising a rotor having a central axis and an outer annular space for accumulating separated sludge, the rotor having a separating space leading inwardly from said sludge space toward the rotor axis, the rotor also having an inlet for admitting a mixture to be separated in said separating space, a separated liquid outlet from said separating space, and an outlet for discharging sludge from said sludge space, the combination of means forming two separate channels each adapted for continuous flow of a liquid through the channel, the first channel opening into said sludge space at a first level, the second channel opening into said separating space at a second level which is nearer the rotor axis than is said first level, first and second stationary ducts located outside the rotor, means connecting said first and second ducts with said first and second channels, respectively, whereby said ducts are operable to receive respective liquid flows which remain the same relative to each other until the flow through said first channel and duct becomes clogged by accumulation of sludge to said first level in the sludge space, and means associated with said ducts for indicating a change in the flow through said first duct relative to the flow through said second duct and thus indicating said clogging.

8. The sludge centrifuge of claim 7, in which said indicating means include a pressure sensing device in each of said ducts.

9. The sludge centrifuge of claim 7, in which said indicating means include a flow rate sensing device in each of said ducts.

10. The sludge centrifuge of claim 7, in which said indicating means include means for sensing changes in the difference between the pressures in the ducts.

11. The sludge centrifuge of claim 10, comprising also a valve movable to open and close said sludge outlet, and an operative connection between the valve and said sensing means for actuating the valve to open the sludge outlet when said difference becomes a predetermined value.

12. The sludge centrifuge of claim 7, comprising also a valve movable to open and close said sludge outlet, said indicating means including means for sensing changes in the difference between the flow rates in said ducts, and an operative connection between the valve and said sensing means for actuating the valve to open the sludge outlet when said difference becomes a predetermined value.

References Cited

UNITED STATES PATENTS

| | | | |
|---|---|---|---|
| 2,145,544 | 1/1939 | Hapgood | 233—19 |
| 2,532,792 | 12/1950 | Svensjo | 233—19 |
| 2,542,456 | 2/1951 | Ayres | 233—19 |
| 2,628,023 | 2/1953 | Dahlstedt | 233—19 |
| 2,917,230 | 12/1959 | Kaldewey | 233—19 |
| 3,126,338 | 3/1964 | Steinacker | 233—20 XR |
| 3,189,268 | 6/1965 | Nilsson | 233—20 XR |
| 3,301,476 | 1/1967 | Hemfort | 233—20 |
| 2,055,915 | 9/1936 | Stigen | 233—19 |
| 2,177,082 | 10/1939 | Staaff | 233—19 |
| 3,117,928 | 1/1964 | Thylefors | 233—20 |

FOREIGN PATENTS

| | | |
|---|---|---|
| 826,502 | 1/1938 | France. |
| 691,386 | 5/1940 | Germany. |

HENRY T. KLINKSIEK, *Primary Examiner.*